(12) United States Patent
Shintani et al.

(10) Patent No.: US 8,451,409 B2
(45) Date of Patent: May 28, 2013

(54) LIQUID CRYSTAL DISPLAY DEVICE AND MANUFACTURING METHOD FOR SAME

(75) Inventors: Hideyuki Shintani, Mobara (JP); Shinichi Soto, Mobara (JP); Hiroshi Saeki, Mobara (JP); Osamu Nagashima, Mobara (JP); Tomokazu Ishikawa, Mobara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 0 days.

(21) Appl. No.: 13/592,973

(22) Filed: Aug. 23, 2012

(65) Prior Publication Data

US 2012/0314167 A1 Dec. 13, 2012

Related U.S. Application Data

(63) Continuation of application No. 12/730,478, filed on Mar. 24, 2010, now Pat. No. 8,274,630.

(30) Foreign Application Priority Data

Mar. 26, 2009 (JP) .................. 2009-075364

(51) Int. Cl.
  *G02F 1/1337* (2006.01)
  *G02F 1/1339* (2006.01)
  *G02F 1/1345* (2006.01)
  *G02F 1/13* (2006.01)

(52) U.S. Cl.
  USPC .......................................... 349/126; 349/149

(58) Field of Classification Search
  USPC .............. 349/106, 126, 149, 187, 42, 43, 92, 349/132, 141
  See application file for complete search history.

(56) References Cited

U.S. PATENT DOCUMENTS

| | | | |
|---|---|---|---|
| 5,684,555 A | 11/1997 | Shiba et al. | |
| 6,128,061 A * | 10/2000 | Lee et al. | 349/141 |
| 6,485,997 B2 | 11/2002 | Lee et al. | |
| 6,512,565 B1 * | 1/2003 | Lee et al. | 349/130 |
| 6,526,081 B2 * | 2/2003 | Kobayashi | 372/46.01 |
| 6,791,634 B2 | 9/2004 | Ichioka et al. | |
| 2008/0218678 A1 | 9/2008 | Nakayama et al. | |
| 2010/0271572 A1 | 10/2010 | Yokogawa | |
| 2011/0133183 A1 | 6/2011 | Yamazaki et al. | |
| 2012/0154732 A1 * | 6/2012 | Morita | 349/143 |

FOREIGN PATENT DOCUMENTS

| | | |
|---|---|---|
| JP | 07-270825 | 10/1995 |
| JP | 08-234220 | 9/1996 |
| JP | 9-244040 | 9/1997 |
| JP | 2004-212690 | 7/2004 |
| JP | 2005-227582 | 8/2005 |

* cited by examiner

*Primary Examiner* — Akm Enayet Ullah
(74) *Attorney, Agent, or Firm* — Antonelli, Terry, Stout & Kraus, LLP.

(57) ABSTRACT

A liquid crystal display device includes a first substrate, a second substrate, liquid crystal disposed between the first substrate and the second substrate, an electrode formed over the first substrate, and an alignment film disposed between the electrode and the liquid crystal. The electrode has a pad portion that protrudes from at least part of a side of the electrode and electrically leads out onto the first substrate through a conductive material that is located between the second substrate and the first substrate, and a direction in which at least one side of the pad portion which protrudes from the electrode is set to angle of 15° or more and 35° or less relative to a side of the first substrate which crosses the extended line of the at least one side of the pad portion.

8 Claims, 11 Drawing Sheets

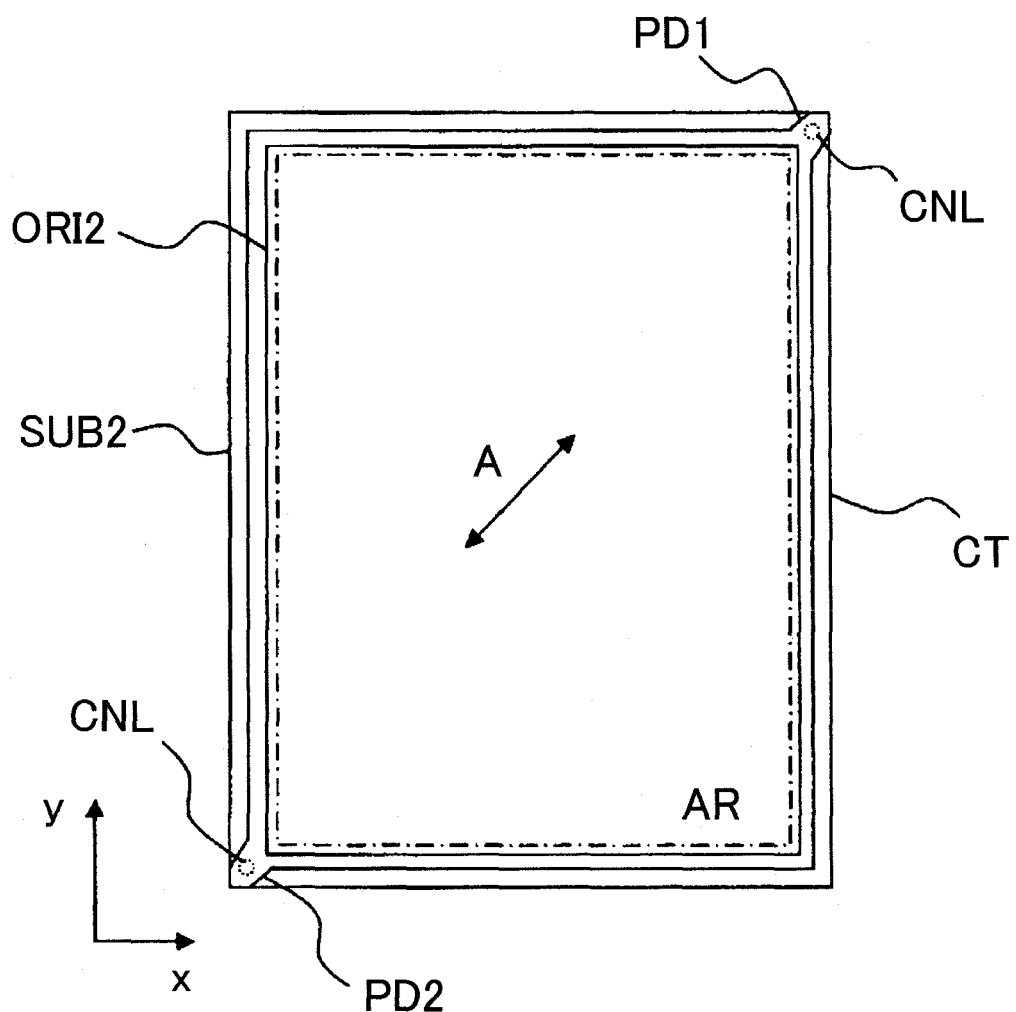

LIQUID CRYSTAL DISPLAY DEVICE AND MANUFACTURING METHOD FOR SAME

CROSS-REFERENCE TO RELATED APPLICATION

This application is a continuation application of U.S. application Ser. No. 12/730,478, filed Mar. 24, 2010 now U.S. Pat. No. 8,274,630, the contents of which are incorporated herein by reference.

The present application claims priority over Japanese Application JP 2009-075364 filed on Mar. 26, 2009, the contents of which are hereby incorporated into this application by reference.

BACKGROUND OF THE INVENTION (1) Field of the Invention

The present invention relates to a liquid crystal display device and a manufacturing method for the same, and in particular, to a longitudinal electrical field mode liquid crystal display device, and a manufacturing method for the same.

(2) Description of the Related Art

Liquid crystal display devices (panels) have a pair of substrates that are positioned so as to face each other and sandwich liquid crystal as outer walls.

In addition, liquid crystal display devices of a so-called longitudinal electrical field mode are provided with a number of pixel electrodes that are positioned in a matrix which are supplied with independent video signals on the surface of one substrate (first substrate) on the liquid crystal side, and a counter electrode that is formed so as to be shared by pixels to which a reference signal for the video signals is supplied on the surface of the other substrate (second substrate) on the liquid crystal side.

The pixel electrodes and the counter electrode are usually formed of a transparent conductive film, so that liquid crystal molecules can be driven by electrical fields in accordance with the difference in potential between the respective pixel electrodes and the counter electrode. In this case, the electrical fields generated between the pixel electrodes and the counter electrode are approximately perpendicular to the substrates (longitudinal), and this is why such liquid crystal display devices are said to have a longitudinal electrical field mode.

In addition, the counter electrode has protrusions (hereinafter referred to as pad portions) in the direction of a diagonal line in a corner, for example, and the structure allows the counter electrode to electrically lead out onto the first substrate through a conductive material provided between the first substrate and second substrate that makes contact with the pad portions. Thus, the terminals for supplying a signal to the counter electrode can be provided in parallel with the terminals for supplying signals in order to drive the pixel electrodes.

FIG. 7A to FIG. 7C are plan diagrams showing an example of the counter electrode CT formed in the second substrate SUB2. Here, FIG. 7A to FIG. 7C correspond to FIG. 5A to FIG. 5C, which show an embodiment of the present invention. Therefore, FIG. 5A to FIG. 5C and other drawings relating to these figures should be referred to for structures that are not described below. In FIG. 7A, the counter electrode CT is provided with pad portions PD (denoted by symbols PD1 and PD2 in the figure) which protrude in the direction in which the below described alignment film ORI2 is rubbed (direction of arrow A in the figure; 45° relative to side of second substrate SUB2) in the corners. FIG. 7B is a diagram showing an enlargement of the pad portion PD1, and FIG. 7B is a diagram showing an enlargement of the pad portion PD2. In this case, the two sides of either the pad portion PD1 or PD2 extend in the direction in which the pad portion protrudes from the counter electrode CT at an angle of 45° relative to the side of the second substrate SUB2 that crosses the extended line of the two sides of the pad. In addition, FIG. 8A to FIG. 8C are diagrams showing another example of the counter electrode CT formed on the second substrate SUB2 and correspond to FIG. 7A to FIG. 7C. The pad portions PD' in FIG. 8A to FIG. 8C (denoted by PD1' and PD2' in the figures) have two sides which extend in the direction in which the pad protrudes from the counter electrode CT at an angle of 90° relative to the side of the second substrate SUB2 that crosses the extended line of the two sides of the pad.

The pad portions PD of the counter electrode CT in FIG. 7A to FIG. 7C are disclosed in JP1996-234220A, and the pad portion PD1' of the counter electrode CT in FIG. 8A to FIG. 8C is disclosed in JP1995-270825A.

In addition, documents relating to the present invention include JP2005-227582A and JP2004-212690A. JP2005-227582A describes that the amount of streaks left when the alignment film is rubbed can be reduced by not forming protruding pad portions in the counter electrode, as described above. Thus, the invention is different from the present invention, which is based on the formation of protruding pad portions in the counter electrode. In JP2004-212690A, one of the two sides along the protruding pad portions of the counter electrode runs 90° relative to the sides of the counter electrode, while the other runs at a smaller angle. However, there are no descriptions concerning the direction in which the alignment is rubbed, and its relation to the pattern of the pad portions is not clear.

Here, in some cases a resin film is formed in a predetermined region on the counter electrode CT after the counter electrodes CT is formed on the substrate SUB2, and then rubbed using a rubbing roller, so that an alignment film ORI2 is formed. As shown in FIG. 7A, in the case of the counter electrode CT shown in FIG. 7A to FIG. 7C, when the resin film is rubbed at an angle of 45° relative to the sides of the substrate SUB2, as described above, so-called rubbing streaks RLN1 and RLN2 are left on the surface of the alignment film ORI2 in the vicinity of the pad portions PD.

SUMMARY OF THE INVENTION

The present inventors looked for what could cause this, and as a result found the following. First, the hairs on the rubbing roller shown in FIG. 7 are disturbed due to the difference in the state of charge in the static electricity with the pad portion PD1 and the substrate SUB2 along the two sides of the pad portion PD1 in the longitudinal direction when the rubbing roller moves (relatively) from right to left in the figure and passes over the pad portion PD1. When the hairs are disturbed, there is a clear border (shown by arrow a in the figure) between where the hairs are disturbed and the portion where the hairs are not disturbed. The hairs remain disturbed even after the rubbing roller passes over the pad portion PD1, and as shown in FIG. 7A, rubbing streaks RLN1 are left on the alignment film. After that, the hairs of the rubbing roller are again disturbed due to the difference in the state of charge in the static electricity between the pad portion PD1 and the substrate SUB2 along the two sides of the pad portion PD2 in FIG. 7C in the longitudinal direction when the rubbing roller passes through the pad portion PD2. When the hairs are disturbed, there is a clear border (shown by arrow b in the figure) between where the hairs are disturbed and the portion where the hairs are not disturbed. The disturbed hairs rub against the alignment film ORI2 that is already rubbed when the rubbing roller rotates, and as a result, as shown in FIG. 7A, rubbing streaks RLN2 are left on the alignment film ORI2.

Here, the direction in which the longitudinal sides of the pad portion PD1 extend is the same as the direction of rubbing, and therefore, there are concentrations of disturbed hairs at the same point around the rubbing roller, and it can be assumed that the rubbing streaks will become more conspicuous.

In addition, in the case of the counter electrode CT in FIG. 8A to FIG. 8C, when the substrate SUB2 is rubbed in a direction at an angle of 45° relative to the side of the substrate SUB2, as shown in FIG. 8A, so-called rubbing streaks RLN3 and RLN4 are left on the surface of the alignment film ORI2 in the vicinity of the pad portions PD. First, the path of the rubbing roller when it runs through the portion where the pad portion PD1' in FIG. 8B is formed and the portion where it is not formed (shown by arrow c in the figure) is provided when the rubbing roller moves (relatively) from right to left in the figure and passes through the pad portion PD1', and the hairs of the rubbing roller are disturbed along this path, and the hairs remain disturbed even after the pad portion PD1 has passed, and as a result, as shown in FIG. 8A, rubbing streaks RLN3 are left on the alignment film ORI2. After that, the path of the rubbing roller when it runs through the portion where the pad portion PD2' in FIG. 8C is formed and the portion where it is not formed (shown by arrow d in the figure) is provided when the rubbing roller passes through the pad portion PD2', and the disturbed hairs rub against the alignment film ORI that is already rubbed when the rubbing roller rotates, and as a result, as shown in FIG. 8A, rubbing streaks RLN4 are left on the alignment film ORI2.

Here, though the rubbing streaks RLN3 and RLN4 are less conspicuous than the rubbing streaks RLN1 and RLN2, they are wider. This is assumed to be because the same point of the rubbing roller passes through the border between the pad portion PD1' and the substrate SUB2 twice per rotation of the rubbing roller, and the hairs are disturbed twice, leaving rubbing streaks, though unlike in the case of FIG. 7A to FIG. 7C, there are no concentrations of disturbed hairs at the same point around the roller, and the disturbed hairs are dispersed over a certain area.

A merit of the present invention is to provide a liquid crystal display device where a smaller amount of so-called rubbing streaks is left on the alignment film, as well as a manufacturing method for the same.

In the liquid crystal display device and manufacturing method for the same according to the present invention, the two sides of the protrusion from the counter electrode in the pad portion form a predetermined angle with the direction in which the alignment film is rubbed. As a result, the amount of disturbed hairs on the rubbing roller can be reduced when the alignment film is rubbed.

The configuration of the present invention can be as follows, for example.

(1) The liquid crystal display device according to the present invention is provided with:

a first substrate in rectangular form and a second substrate in rectangular form that is positioned so as to face the first substrate with liquid crystal in between;

pixel electrodes that are respectively formed in a number of pixel regions which form an image display region on the surface of the first substrate on the liquid crystal side, and a first alignment film that is formed on the image display region so as to make contact with the liquid crystal; and a counter electrode that is formed on the surface of the second substrate on the liquid crystal side so as to cover the number of pixel regions over the entirety of the image display region, and a second alignment film that is formed on the image display region so as to make contact with the liquid crystal, the second alignment film is rubbed at an angle in a range of 45°+/−3° relative to one side of the second substrate, the counter electrode is provided with a pad portion that protrudes from at least part of the side in the direction in which the second alignment film is rubbed and electrically leads out onto the first substrate through a conductive material that is located between the second substrate and the first substrate so as to make contact with the pad portion, and the direction in which the two sides of the pad portion which protrudes from the counter electrode extend is set to angle of 15° or more and 35° or less relative to the side of the second substrate which crosses the extended line of the side of the pad portion.

(2) The liquid crystal display device according to the present invention is the liquid crystal display device of (1), the pad portion of the counter electrode is formed in a corner of the counter electrode.

(3) The liquid crystal display device according to the present invention is the liquid crystal display device of (2), characterized by being provided with the same pad portion at diagonally opposite corners.

(4) The liquid crystal display device according to the present invention is the liquid crystal display device of (1), the counter electrode and the pad portion are formed of a transparent conductive film.

(5) The manufacturing method for a liquid crystal display device according to the present invention is a manufacturing method for a liquid crystal display device that is provided with:

a first substrate in rectangular form and a second substrate in rectangular form that is positioned so as to face the first substrate with liquid crystal in between;

pixel electrodes that are respectively formed in a number of pixel regions which form an image display region on the surface of the first substrate on the liquid crystal side, and a first alignment film that is formed on the image display region so as to make contact with the liquid crystal; and a counter electrode that is formed on the surface of the second substrate on the liquid crystal side so as to cover the number of pixel regions over the entirety of the image display region, and a second alignment film that is formed on the image display region so as to make contact with the liquid crystal and rubbed at an angle in a range of 45°+/−3° relative to one side of the second substrate, wherein the counter electrode is provided with a pad portion that protrudes from at least part of the side in the direction in which the second alignment film is rubbed and electrically leads out onto the first substrate through a conductive material that is located between the second substrate and the first substrate so as to make contact with the pad portion, and the direction in which the two sides of the pad portion which protrudes from the counter electrode extend is set to angle of 15° or more and 35° or less relative to the side of the second substrate which crosses the extended line of the side of the pad portion, and the second alignment film is rubbed in a direction at an angle in a range of 45°+/−3° relative to one side of the second substrate.

(6) The manufacturing method for a liquid crystal display device according to the present invention is the manufacturing method for a liquid crystal display device of (5), the pad portion of the counter electrode is formed in a corner of the counter electrode.

(7) The manufacturing method for a liquid crystal display device according to the present invention is the manufacturing method for a liquid crystal display device of (6), characterized by being provided with the same pad portion at diagonally opposite corners.

(8) The manufacturing method for a liquid crystal display device according to the present invention is the manufacturing method for a liquid crystal display device of (5), the counter electrode and the pad portion are formed of a transparent conductive film.

Here, the configurations are merely examples, and the present invention can be modified as deemed appropriate, as long as the technological idea is not deviated from. In addition, examples of the configuration of the present invention other than those described above will become clearer from the description throughout the present specification and the drawings.

In accordance with the liquid crystal display device and manufacturing method for the same, the amount of so-called rubbing streaks that are left in the alignment film can be reduced.

Other effects of the present invention will become clearer from the description throughout the specification.

BRIEF DESCRIPTION OF THE DRAWINGS

FIG. 1A to FIG. 1C are plan diagrams showing the substrate on which a counter electrode is formed in the configuration of the liquid crystal display device according to the first embodiment of the present invention as viewed from the surface on the liquid crystal side;

DESCRIPTION OF THE PREFERRED EMBODIMENTS

Figure 1B:
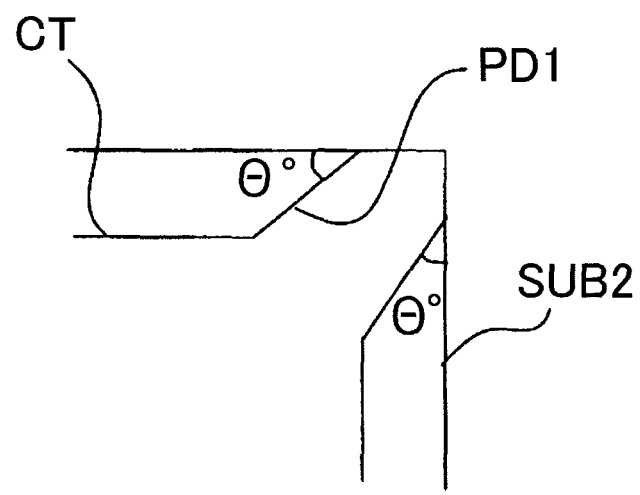

The embodiments of the present invention are described below in reference to the drawings. Here, the same symbols are used for components that are the same or similar in the drawings and embodiments, and the descriptions thereof are not repeated.

[First Embodiment]
(Configuration of Liquid Crystal Display Device)

Figure 2:
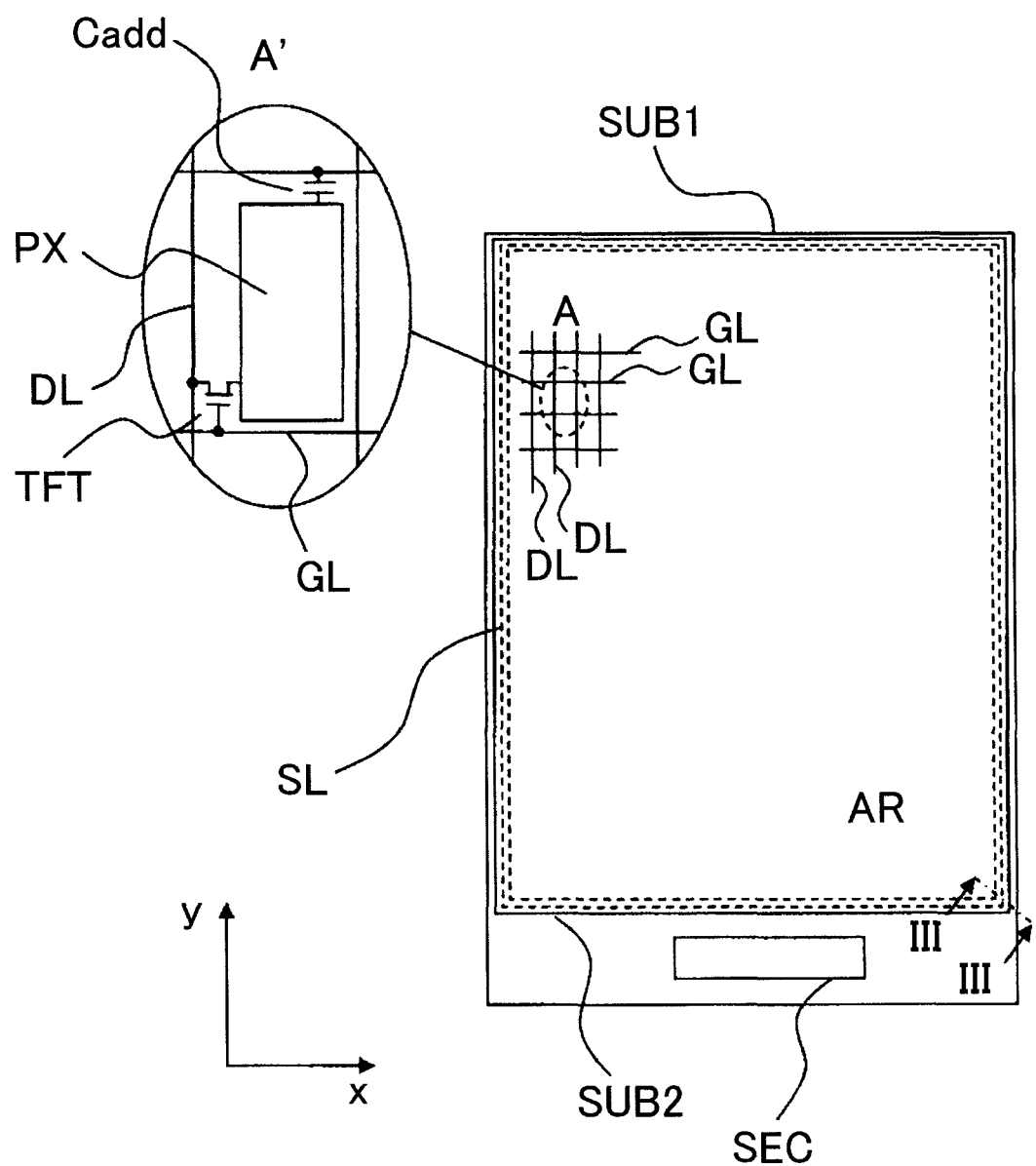
FIG. 2 is a schematic plan diagram showing the liquid crystal display device according to the first embodiment of the present invention.

FIG. 2 is a schematic plan diagram showing the liquid crystal display device according to the first embodiment of the present invention.

In FIG. 2, one substrate in rectangular form (hereinafter referred to as first substrate) SUB1 and another substrate in rectangular form (hereinafter referred to as second substrate) SUB2 are positioned so as to face each other and sandwich liquid crystal (not shown), and the first substrate SUB1 and the second substrate SUB2 form the outer wall of the liquid crystal display device.

The second substrate SUB2 is positioned so that the edge portion of the first substrate SUB1 is exposed on the lower side in the figure, for example, and secured to the first substrate SUB1 by means of a sealing material SL that is formed around the edge of the second substrate SUB2. In addition, the sealing material SL also functions to seal in the liquid crystal sandwiched between the first substrate SUB1 and the second substrate SUB2. Part of the region surrounded by the sealing material SL as viewed from the top forms an image display region AR. A semiconductor device (chip) SEC is mounted in the part of the first substrate SUB1 that is exposed from the second substrate SUB2, so that the semiconductor device SEC drives the below described pixels within the image display region AR.

Gate signal lines GL which extend in the direction x in the figure and are aligned in the direction Y in the figure, as well as drain signal lines DL which extend in the direction y in the figure and are aligned in the direction X in the figure are formed on the surface in the image display region AR of the first substrate SUB1 on the liquid crystal side. Thus, regions surrounded by adjacent gate signal lines GL and drain signal lines DL are used as pixel regions. As a result, the image display region AR is formed of a set of a great number of pixel regions that are aligned in a matrix.

Each pixel region is provided with a thin film transistor TFT which is turned on by a scan signal from the gate signal line GL in FIG. A', which is an enlargement of the circled area A in FIG. 2, a pixel electrode PX to which a video signal is supplied from the drain signal line DL through the thin film transistor TFT when it is turned on, and a capacitor element Cadd that is formed between the pixel electrode PX and the top gate signal line GL (the pixel electrode PX is located between the top gate signal line and the gate signal line that drives the thin film transistor TFT).

Gate signal lines GL and drain signal lines DL are connected to respective output electrodes of the semiconductor device SEC via lead-out lines, not shown, that are formed around the image display region AR.

Here, though FIG. A' shows an equivalent circuit, the elements correspond to actual geometrical points, and the gate signal lines GL, the drain signal lines DL, the thin film transistor TFT, the pixel electrode PX and the capacitor element Cadd are formed of a multilayer body of conductive films, insulating films and semiconductor films which are patterned through selective etching in accordance with a photolithographic technology. This multilayer body has an alignment film (hereinafter referred to as first alignment film) formed in the uppermost layer so as to make contact with the liquid crystal.

In addition, though not shown, a multilayer body may be formed on the surface of the second substrate SUB2 on the liquid crystal side of a black matrix, a color filter and a counter electrode formed so as to cover a number of pixel regions over the entire image display region, for example. In addition, this multilayer body has an alignment film (hereinafter referred to as second alignment film) formed in the uppermost layer so as to make contact with the liquid crystal.

Figure 3:
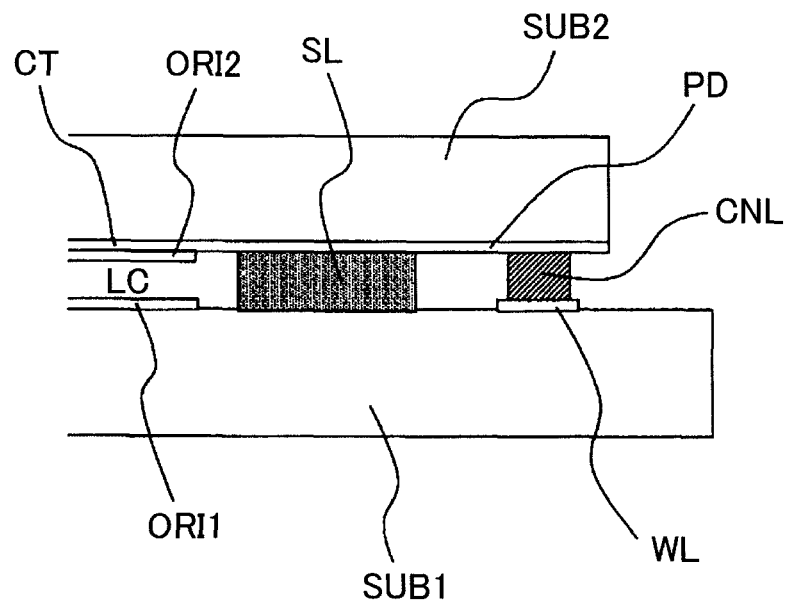
FIG. 3 is a cross sectional diagram along line in FIG. 2.

As shown in FIG. 3, which is a cross sectional diagram along line in FIG. 2, the counter electrode (denoted by symbol CT in the figure) is formed inside the sealing material SL on the surface of the second substrate SUB2 on the liquid crystal side, and the counter electrode CT has a portion that protrudes beyond the sealing material SM (this portion is referred to as pad portion PD). In addition, a wire layer WL is formed in the portion of the first substrate SUB1 that faces the pad portion PD, and a conductive layer CNL is formed between the second substrate SUB2 and the firs substrate SUB1 so as to make contact with the pad portion PD and the wire layer WL. As a result, the counter electrode CT electrically leads out to the wire layer WL on the first substrate SUB1 through the conductive material CNL. Here, FIG. 3 shows the counter electrode CT and the alignment film ORI2 on the second substrate SUB2 side, and the alignment film ORI1 and the wire layer WL on the first substrate SUB1 side, and other material layers are omitted.

FIG. 1A is a plan diagram showing the second substrate SUB2 in FIG. 2 when it is disengaged from the first substrate SUB1 from the back when flipped over sideways. Here, FIG. 1A shows the points of the conductive layer CNL relative to the pad portions PD of the counter electrode CT with dotted circles.

The counter electrode CT formed on the surface of the second substrate SUB2 so as to cover at least the image display region AR (shown by dotted line in figure) has pad portions PD formed so as to protrude in the top right and bottom left corners in the figure at an angle of 45° relative to the direction X in the figure. Here, the direction in which the pad portions PD protrude is the same as the direction in which the below described alignment film ORI2 is rubbed (direction of arrow A in the figure).

FIG. 1A is an enlargement of the pad portion PD formed in the top right corner of the counter electrode CT in the figure (denoted by the symbol PD1 in the figure). In this case, each side of the pad portion PD1 in the direction in which it protrudes from the counter electrode CT extends in a direction that forms an angle θ° with the side of the second substrate SUB2, and this angle θ° is set to an angle of 15° or more and 35° or less. That is to say, the angle θ° is set to an angle that is nowhere near 45° or 90°.

Figure 1C:
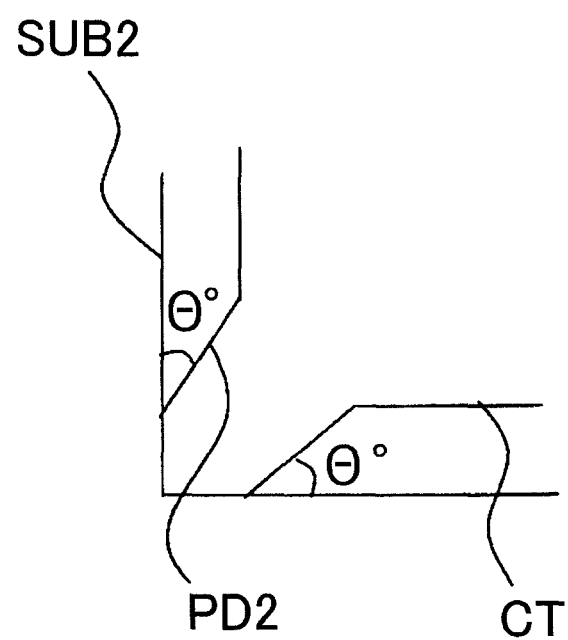

Likewise, FIG. 1C is an enlargement of the pad portion PD (denoted by the symbol PD2 in the figure) formed in the bottom left corner of the counter electrode CT in the figure. In this case, each side of the pad portion PD2 in the direction in which it protrudes from the counter electrode CT extends in a direction that forms an angle θ° with the side of the second substrate SUB2, and this angle θ° is set to an angle of 15° or more and 35° or less. That is to say, the angle θ° is set to an angle that is nowhere near 45° or 90°.

In addition, an alignment film ORI2 is formed in the layer above the counter electrode CT so as to cover at least the image display region AR, and this alignment film ORI2 is rubbed at 45° (direction of arrow A in the figure) from the direction x in the figure.

The thus formed liquid crystal display device has the pad portions PD1 and PD2 of the counter electrode CT formed as described above, and thus, there are less rubbing streaks on the rubbed surface of the alignment film ORI2. The reason for this is explained below, together with the manufacturing method for a liquid crystal display device.

(Manufacturing Method for Liquid Crystal Display Device)

Figure 4:
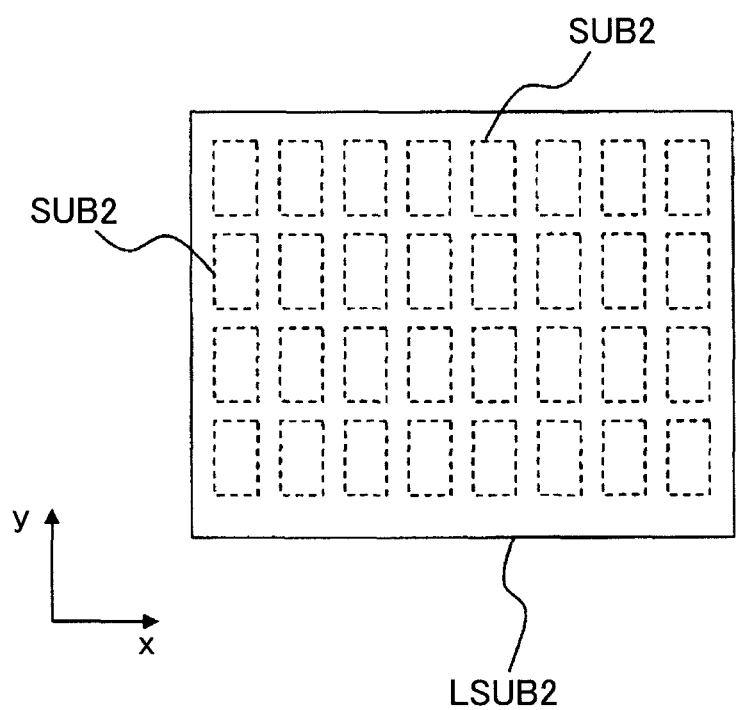
FIG. 4 is a diagram for illustrating the manufacturing method for a liquid crystal display device according to the present invention, and shows how a substrate for a number of smaller substrates can be divided into a number of substrates through cutting.

FIG. 4 shows that when a counter electrode CT and an alignment film ORI2 are formed on the surface of the second substrate SUB2 on the liquid crystal side, the counter electrode CT and the alignment film ORI2 are initially formed within a number of regions on a substrate LSUB2 from which a number of second substrates SUB2 are cut out afterward.

In FIG. 4, a number of regions that re aligned in the directions x and y in the figure (shown by dotted frames in the figure) indicate second substrates SUB2 which are to be cut out in a following process.

In addition, a black matrix (not shown) and a color filter (not shown) may be formed in regions for the respective second substrates SUB2 before they are cut out from the substrate LSUB2 for a number of smaller substrates if necessary.

Figure 5A:
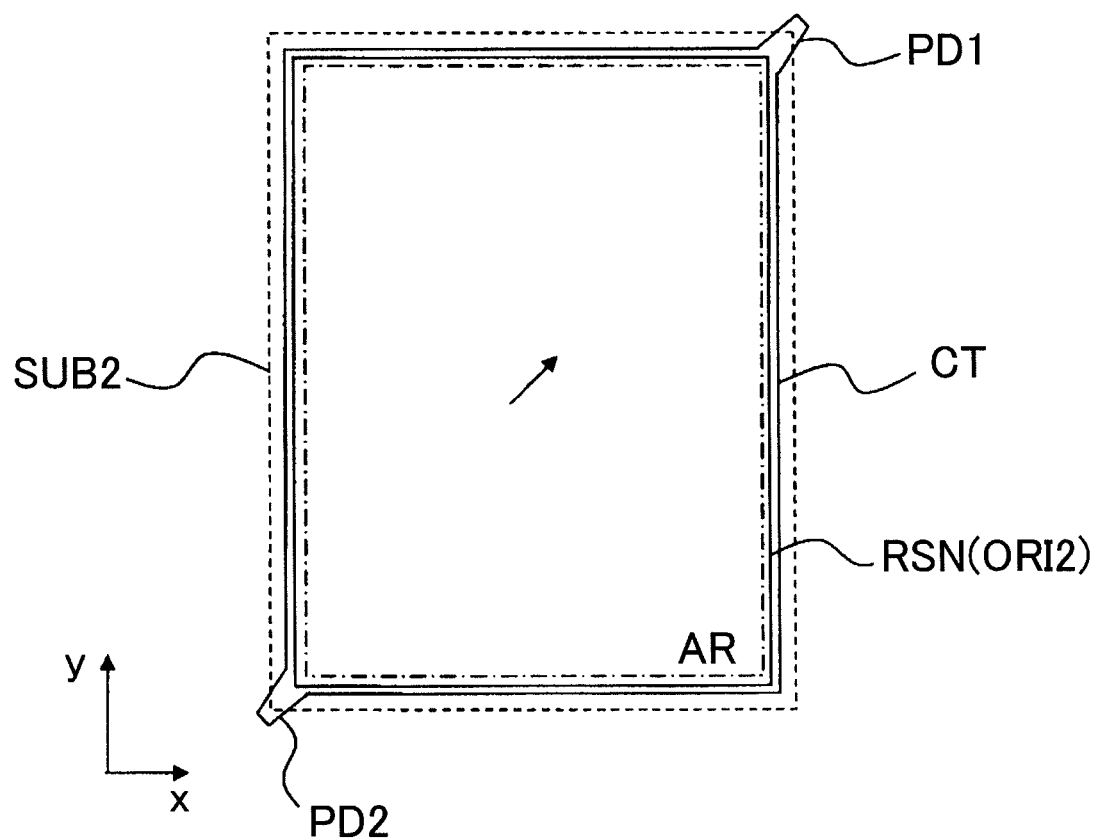
FIG. 5A to FIG. 5C are diagrams for illustrating the process for forming a counter electrode (with pad portions) on the surface of a substrate and a resin film from which an alignment film can be made.
Figure 5B:
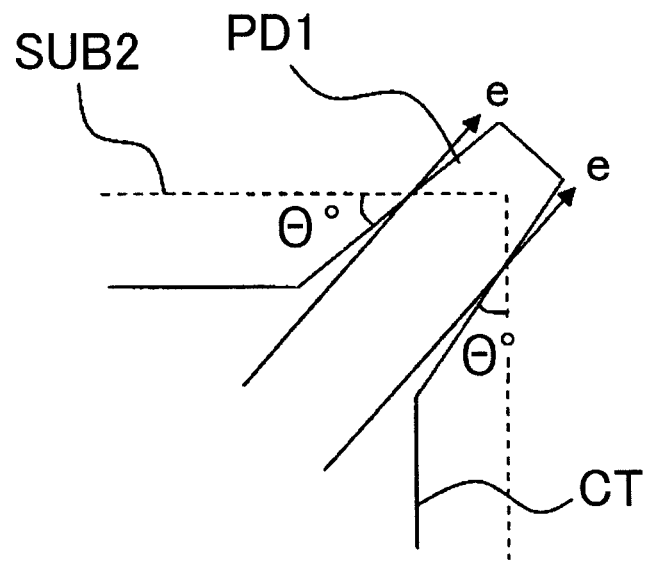
Figure 5C:
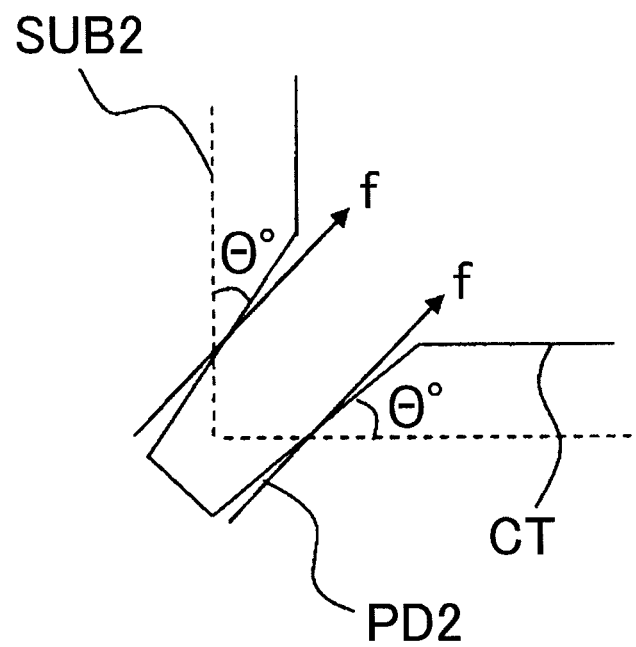

In addition, the counter electrode 5 is formed as shown in FIG. 5A. Here, FIG. 5A shows the area around one of the number of regions for the second substrates SUB2 in FIG. 4. As shown in FIG. 1A, the counter electrode 5 is formed so as to cover at least the image display region AR (shown by one-dot chain frame in the figure). In addition, a pad portion PD1 is formed in the top right corner of the counter electrode 5 so as to protrude at an angle of 45° relative to the direction x in the figure. FIG. 5B is an enlargement of this pad portion PD1 showing how each side of this pad portion PD1 that protrudes from the counter electrode CT crosses a side of the second substrate SUB2 at an angle θ°, and this angle θ° is set to 15° or more and 35° or less. Likewise, a pad portion PD2 is formed in the bottom left corner of the counter electrode 5 in the figure so as to protrude at an angle of 45° relative to the direction x in the figure. FIG. 5C is an enlargement of this pad portion PD2 showing how each side of this pad portion PD2 that protrudes from the counter electrode CT crosses a side of the second substrate SUB2 at an angle θ°, and this angle θ° is set to 15° or more and 35° or less. Likewise, a pad portion PD2 is formed in the bottom left corner of the counter electrode 5 in the figure so as to protrude at an angle of 45° relative to the direction x in the figure.

In FIG. 5A to FIG. 5C, the pad portion PD1 and the pad portion PD2 are formed so as to run beyond the region of the second substrate SUB2. As a result, when the second substrate SUB2 is cut out from the substrate LSUB2 for a number of smaller substrates, the protruding ends of the pad portions PD1 and PD2 are formed so to reach the edge of the substrate SUB2, so that the area of the pad portions PD1 and PD2 can be kept large. This is in order to ensure the reliability of the connection to the conductive material CNL.

After that, a resin is applied on the surface of the substrate LSUB2 for a number of smaller substrates so that it covers at least the image display region AR, and a patterned resin film RSN is formed as shown in FIG. 5A to FIG. 5C. This resin film RSN undergoes the below rubbing process so as to be converted to an alignment film ORI2.

Figure 6:
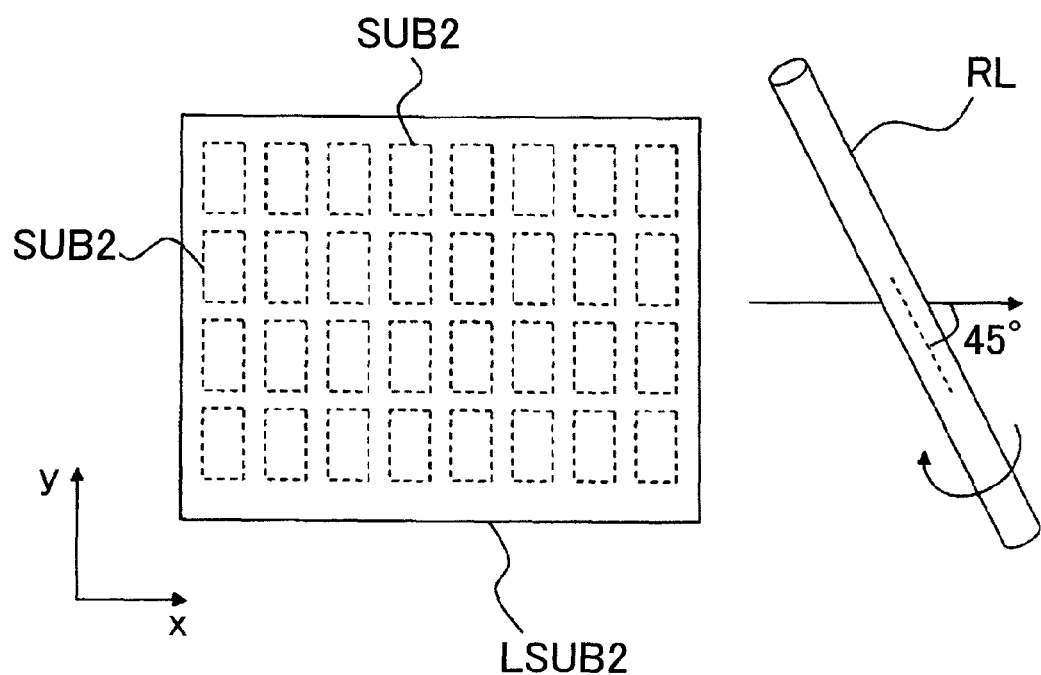
FIG. 6 is a diagram for illustrating the step of rubbing the resin film formed on the substrate for a number of smaller substrates so that an alignment film is formed.
Figure 7A:
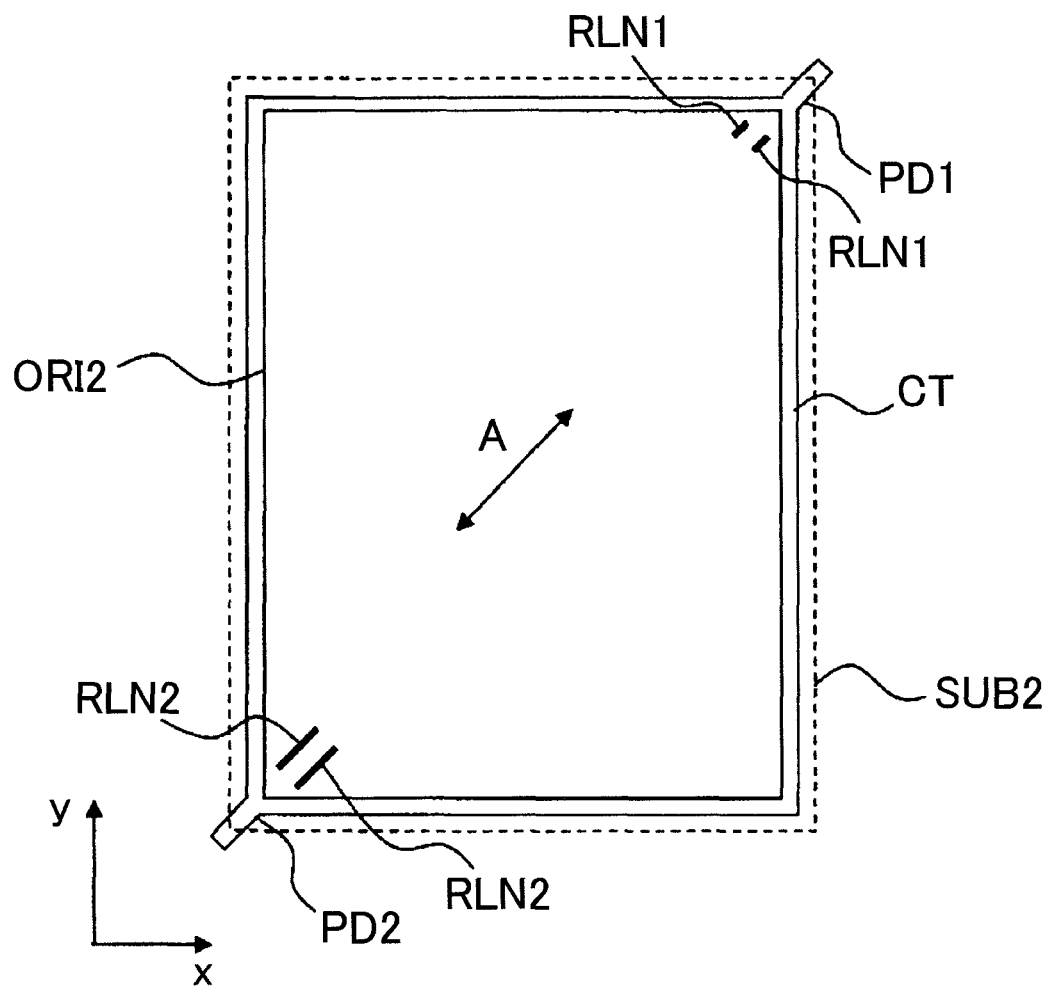
FIG. 7A to FIG. 7C are plan diagrams showing the substrate on which a counter electrode is formed in an example of a conventional liquid crystal display device as viewed from the surface on the liquid crystal side.
Figure 7B:
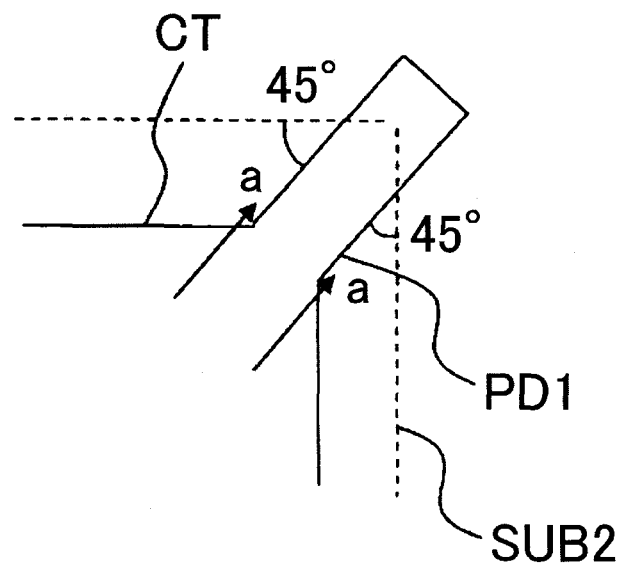
Figure 7C:
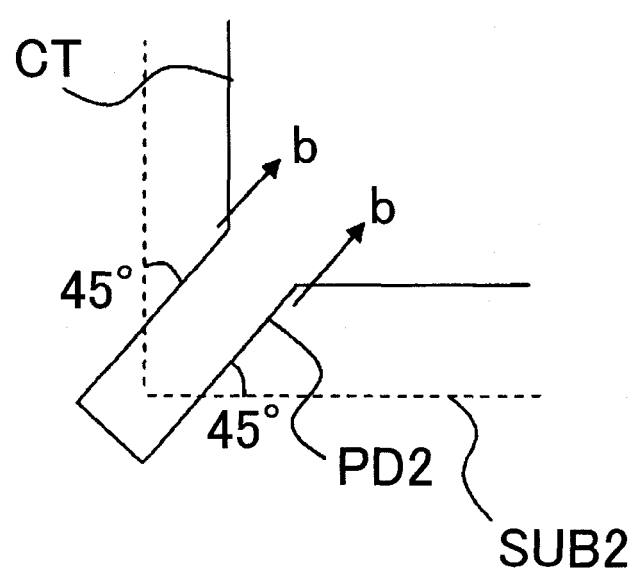
Figure 8A:
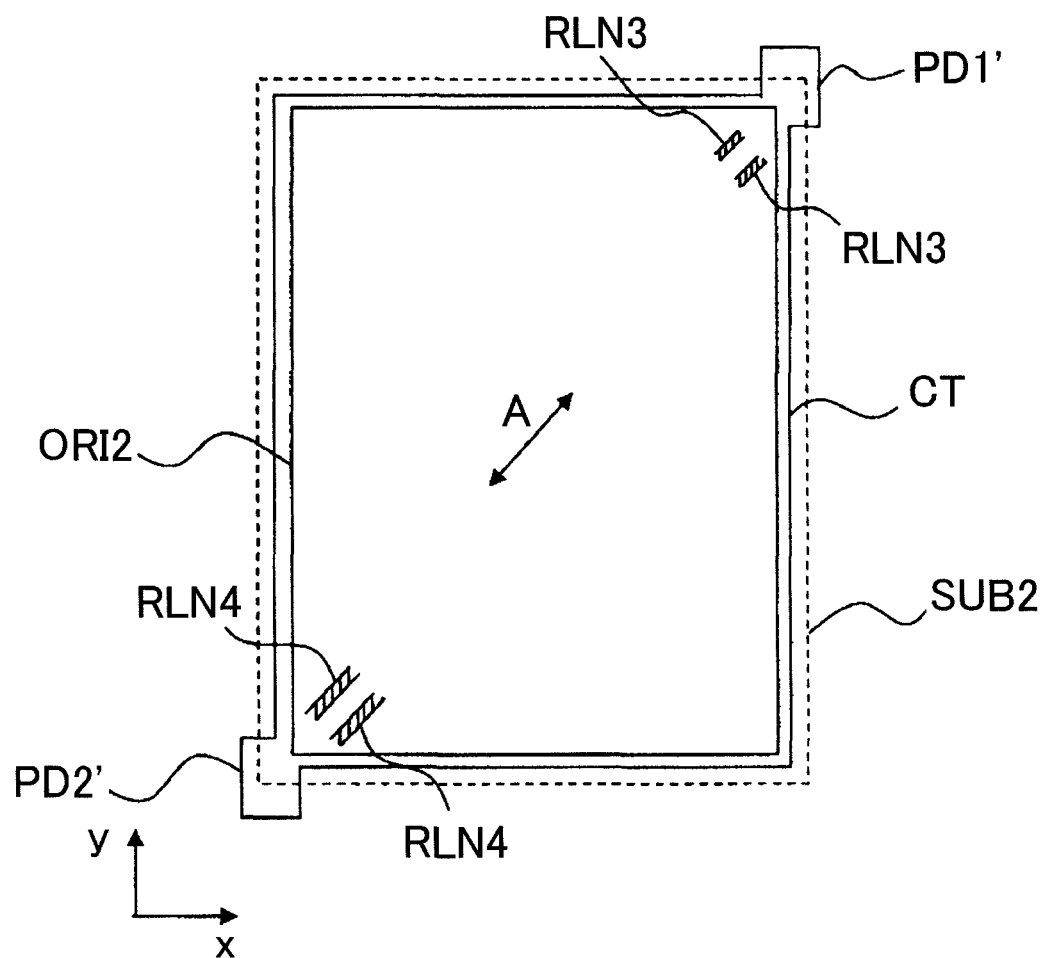
FIG. 8A to FIG. 8C are plan diagrams showing the substrate on which a counter electrode is formed in another example of a conventional liquid crystal display device as viewed from the surface on the liquid crystal side.
Figure 8B:
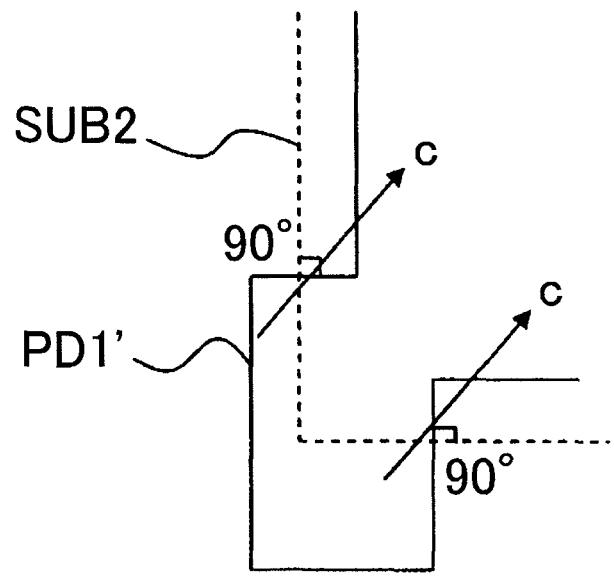
Figure 8C:
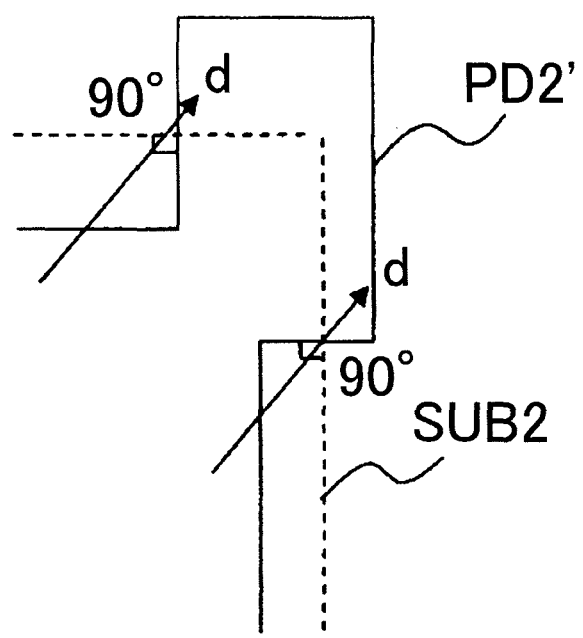

FIG. 6 shows the step of rubbing the resin film RSN after the process is carried out on the surface of the substrate LSUB2 for a number of smaller substrates. FIG. 6 shows a rubbing roller RL which is provided so as to be inclined at an angle of 45° relative to the direction x in the figure and can rotate around its axis. This rubbing roller RL is fixed in a certain position.

Meanwhile, the substrate LSUB2 for a number of smaller substrates can move in the direction x in the figure, and during the course of movement, the rubbing roller RL rubs the surface of the resin film RSN (not shown in FIG. 6) of the substrate LSUB2 for a number of smaller substrates while rotating. As a result, an alignment film ORI2 which is rubbed in a direction 45° relative to the direction x is provided on the surface of the resin film RSN.

Returning to FIG. 5, a case where the rubbing roller RL passes through one of the pad portions PD of the counter electrode CT is described. When the rubbing roller RL passes through the pad portion PD1 in FIG. 5B, it the hairs of the rubbing roller are easily disturbed due to the difference in the state of charge of static electricity between the pad portion PD1 and the substrate LSUB2 for a number of smaller substrates along the long sides of the pad portion PD1. As concerns the disturbed hairs along the path indicated by the arrow e in FIG. 5B, for example, however, the direction of rubbing and the direction in which the long sides of the pad portion PD1 extend are not the same, and therefore, the points where the hairs are disturbed are dispersed in a certain range instead of being concentrated at the same point along the axis of the rubbing roller RL. In addition, the same point around the rubbing roller RL passes the border between the pad portion PD1 and the substrate LSUB2 for a number of smaller substrates only once per rotation of the rubbing roller RL. As a result, the hairs are not disturbed as much as in the conventional case of FIG. 7A to FIG. 8C, and thus, no rubbing streaks are left, or the rubbing streaks are less conspicuous, on the alignment film ORI2.

Next, a case where the rubbing roller RL passes through the pad portion PD2 in FIG. 5C is described. In this case also, the hairs along the path indicated by the arrow f are prevented from being disturbed, for the same reasons as in the case of the path indicated by the arrow e in FIG. 5B, and thus, no rubbing streaks are left, or the rubbing streaks are less conspicuous, on the alignment film.

[Second Embodiment]

In the first embodiment, the direction in which the alignment film ORI2 is rubbed is set to an angle of 45° relative to a side of the second substrate SUB2. However, there are cases where the angle might be slightly changed in order to gain certain, desired properties, and errors during the manufacturing process are also possible. Accordingly, the direction in which the alignment film ORI2 is rubbed may be an angle within a range of 45°+/−3° relative to the second substrate SUB2.

In such cases also, the direction in which the sides of the pad portion PD protruding from the counter electrode CT extends can be set to an angle of 15° or more and 35° or less relative to the side of the second substrate that crosses, and as a result, the amount of rubbing streaks on the alignment film ORI2 can be reduced.

[Third Embodiment]

In the first embodiment, the direction in which the sides of the protrusion of the pad portion PD that protrudes from the counter electrode CT extend is set to an angle of θ° (15° or more and 35° or less) relative to the side of the second substrate.

However, when one side of the pad portion PD extends so as to cross the side of the second substrate at an angle θ1° and the other side of the pad portion PD extends so as to cross the side of the second substrate at an angle θ2°, θ1° and θ2° may have different values. However, both θ1° and θ2° must, of course, have a value of 15° or more and 35° or less.

[Fourth Embodiment]

In the first embodiment, two pad portions PD are provided along a diagonal line on the counter electrode CT. However, the same effects can be gained with a structure where there is only one pad portion PD. In addition, pad portions may be formed in all of the corners of the counter electrode Ct, so that four pad portions are provided in total in the configuration.

[Fifth Embodiment]

Though in the first embodiment, the pad portions are formed so as to reach the edge of the second substrate SUB2, the invention is not limited to this, and the pad portions may not be formed so as to reach the edge of the second substrate SUB2. In this case also, the angle θ° is set to 15° or more and 35° or less, and the sides of the pad portion that protrudes from the counter electrode extend at a certain angle relative to the second substrate that crosses (including both cases where the side crosses the second substrate when extending, as in the first embodiment, and cases where the side crosses the second substrate when imaginarily extending) extend at the same angle θ° relative to the side of the second substrate.

Though the present invention is described in the above using embodiments, the structures according to the above embodiments are merely examples, and the present invention can be modified as deemed appropriate, as long as the technological idea of the present invention is not deviated from. In addition, the structures described in the embodiments may be combined for use, as long as they are compatible.

What is claimed is:

1. A liquid crystal display device comprising:
a first substrate and a second substrate that is positioned to face the first substrate with liquid crystal therebetween;
pixel electrodes that are formed in an image display region, and a first alignment film that is formed over the pixel electrodes; and
a counter electrode that is formed on the second substrate, and a second alignment film that is formed over the counter electrode;
wherein the counter electrode is provided with a pad portion that protrudes from at least part of a side of the counter electrode and electrically leads out onto one of the first substrate and the second substrate through a conductive material that is located between the second substrate and the first substrate; and
wherein a direction in which two sides of the pad portion which protrudes from the counter electrode extend is set to angle of 15° or more and 35° or less relative to a side of the second substrate which crosses an extended line of one of the two sides of the pad portion.

2. The liquid crystal display device according to claim 1, wherein the pad portion of the counter electrode is formed in a corner of the counter electrode.

3. The liquid crystal display device according to claim 2, wherein a pair of the pad portions is formed at diagonally opposite corners of the counter electrode.

4. The liquid crystal display device according to claim 1, wherein the counter electrode and the pad portion are formed of a transparent conductive film.

5. A liquid crystal display device comprising:
a first substrate;
a second substrate;
liquid crystal disposed between the first substrate and the second substrate;
an electrode formed over the first substrate; and
an alignment film disposed between the electrode and the liquid crystal;
wherein the electrode has a pad portion that protrudes from at least part of a side of the electrode and electrically leads out onto the first substrate through a conductive material that is located between the second substrate and the first substrate; and
wherein a direction in which at least one side of the pad portion which protrudes from the electrode is set to angle of 15° or more and 35° or less relative to a side of the first substrate which crosses the extended line of the at least one side of the pad portion.

6. The liquid crystal display device according to claim 5, wherein the pad portion of the electrode is formed in a corner of the electrode.

7. The liquid crystal display device according to claim 6, wherein a pair of the pad portions is formed at diagonally opposite corners of the electrode.

8. The liquid crystal display device according to claim 5, wherein the electrode and the pad portion are formed of a transparent conductive film.

* * * * *